(12) United States Patent
Matsuo et al.

(10) Patent No.: US 8,089,500 B2
(45) Date of Patent: Jan. 3, 2012

(54) OPTICAL SCANNING DEVICE AND IMAGE FORMING APPARATUS PROVIDED WITH THE SAME

(75) Inventors: Manabu Matsuo, Osaka (JP); Takasumi Wada, Osaka (JP); Nobuhiro Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 12/645,624

(22) Filed: Dec. 23, 2009

(65) Prior Publication Data

US 2010/0183335 A1 Jul. 22, 2010

(30) Foreign Application Priority Data

Jan. 20, 2009 (JP) ................................. 2009-009527

(51) Int. Cl.
*B41J 15/14* (2006.01)
*B41J 27/00* (2006.01)
(52) U.S. Cl. ........................................ 347/241; 347/256
(58) Field of Classification Search .................. 347/230, 347/241, 242, 256, 257; 399/98, 99, 123
See application file for complete search history.

(56) References Cited

U.S. PATENT DOCUMENTS

| | | | | |
|---|---|---|---|---|
| 5,936,652 A | * | 8/1999 | Narayan et al. | 347/136 |
| 7,203,444 B2 | * | 4/2007 | Yamazaki | 399/98 |
| 7,436,426 B2 | * | 10/2008 | Lim | 347/263 |
| 7,515,171 B2 | * | 4/2009 | Lim | 347/263 |
| 7,872,664 B2 | * | 1/2011 | Yamakawa et al. | 347/241 |
| 2007/0070173 A1 | | 3/2007 | Yamakawa et al. | |

FOREIGN PATENT DOCUMENTS

| | | |
|---|---|---|
| JP | 2-272470 | 11/1990 |
| JP | 2003-036008 | 2/2003 |
| JP | 2007-144853 | 6/2007 |

* cited by examiner

*Primary Examiner* — Hai C Pham
(74) *Attorney, Agent, or Firm* — Renner, Otto, Boisselle & Sklar, LLP (57) ABSTRACT

An optical scanning device cover, covering an upper portion of an optical scanning device, includes an exposure window, a close stopper, an open stopper, and a rotation cam plate. A projection to be held in a link portion of a rotation cam is fixedly provided on a shutter. When the rotation cam is rotated in a direction of an arrow R(1) from a state in which the shutter is closed, A-side of the shutter turns until the shutter comes into contact with the open stopper to open that side of shutter, and thereafter, the B-side of the shutter turns to open that side of the shutter.

12 Claims, 13 Drawing Sheets

OPTICAL SCANNING DEVICE AND IMAGE FORMING APPARATUS PROVIDED WITH THE SAME

CROSS-REFERENCE TO RELATED APPLICATION

This nonprovisional application claims priority under 35 U.S.C. §119(a) on Patent Application No. 2009-009527 filed in Japan on Jan. 20, 2009, the entire contents of which are hereby incorporated by reference.

BACKGROUND OF THE INVENTION

1. Field of the Invention

The present invention relates to an optical scanning device for performing optical writing in, for example, an electrophotographic printer and, more specifically, to an optical scanning device provided with a shutter for opening/closing a laser beam exposure window with a simple structure, as well as to an image forming apparatus including the device.

2. Description of the Background Art

Image forming apparatuses such as a laser printer, a digital copy machine and a laser facsimile include an optical scanning device for writing an electrostatic latent image on a photoreceptor (electrostatic latent image carrier). Recently, as higher image quality of image forming apparatuses has been required, it becomes a problem that a laser beam exposure window of the optical scanning device becomes grimy because of toner or dust and intercepts the laser beam so that image quality degrades. Further, since size reduction of the image forming apparatuses has been desired, arrangement of optical scanning devices in the image forming apparatuses has been diversified. For example, it may be positioned lower than the photoreceptor. In such an arrangement, falling toner or dust in the image forming apparatus may dirty a dustproof glass provided on the laser beam exposure window, possibly degrading image quality.

In such an image forming apparatus, works of toner replenishment and photoreceptor exchange are necessary. If toner or dust should adhere to the laser beam exposure window during such works, image quality would be degraded. Further, during such works, a polygon mirror for laser scanning is stopped. Therefore, if laser beam emission should occur, a narrow-focused laser beam could be emitted.

In view of such problems, Japanese Patent Laying-Open No. 2-272470 (Document 1) discloses an image forming apparatus that reliably prevents leakage of laser beam to the outside on occasions possibly leading to laser beam leakage, for example, when a photoreceptor unit is taken out from the image forming apparatus for maintenance. The image forming apparatus has a laser scanning optical system, a unit including an image carrier and a mechanism for forming an image on the image carrier, and a container for recovering and storing residual toner on a surface of the image carrier, in which a shutter for intercepting laser beam from the scanning optical system is provided. The shutter is opened/closed, linked with attachment/detachment of a unit substantially integrating the image carrier unit and the toner recovery container.

Further, Japanese Patent Laying-Open No. 2007-144853 (Document 2) discloses an optical scanning device suitable for an image forming apparatus having a shutter mechanism provided between an image carrier and the optical scanning device, which does not require a large space in up-down direction in the image forming apparatus. The optical scanning device scans an object surface by emitting light flux from a light source through an exposure window of an optical housing, and the device is provided with an integral shutter member for opening/closing the exposure window, with the shutter member moved by driving means (motor) using a link mechanism.

SUMMARY OF THE INVENTION

In the image forming apparatus disclosed in Document 1, however, smooth opening/closing operation of the shutter member cannot be realized unless uniform force for opening/closing is applied to guides (guides provided on opposite ends of the exposure window) of left-right directions for sliding the shutter member. In contrast, in the optical scanning device disclosed in Document 2, a motor is provided approximately at the center of exposure window, so that uniform opening/closing force can be applied in the left-right directions through the link mechanism. Though such an arrangement makes smaller the size in up-down direction in the image forming apparatus, the motor protrudes in the front-rear direction of the optical scanning device, possibly resulting in a dead space between the image forming apparatus and the optical scanning device.

Therefore, an object of the present invention is to provide an optical scanning device that can realize smooth opening/closing operation of a shutter with a simple structure while reducing a dead space between the image forming apparatus and the optical scanning device, as well as to provide an image forming apparatus including such a device.

According to an aspect, the present invention provides an optical scanning device, scanning an image carrier with a light beam emitted from an exposure window formed on a housing, for forming an electrostatic latent image on the image carrier, including: a shutter member provided on an upper surface of the housing, for opening/closing the exposure window; a link mechanism for sliding the shutter member; a rotating member for operating the link mechanism; and a regulating member provided on the housing, to be engaged with the shutter member. The link mechanism allows sliding of the shutter member so that the exposure window is opened/closed at one end in the longitudinal direction of the shutter member, until the shutter member slid by the operation of the rotating member engages with the regulating member, and allows sliding of the shutter member so that the exposure window is opened/closed at the other end opposite to the one end, after the shutter member engages with the regulating member.

Here, when the link mechanism is provided at an end away from the center in the longitudinal direction of the shutter member, the link mechanism may be adapted to allow sliding of the shutter member so that the exposure window is opened/closed at a link mechanism side until the shutter member engages with the regulating member, and allows sliding of the shutter member so that the exposure window is opened/closed at a side opposite to the link mechanism side after the shutter member engages with the regulating member.

Further, the regulating member may include an open stopper that functions when the exposure window is opened and a close stopper that functions when the exposure window is closed.

Here, the regulating member may be provided on the link mechanism side. The regulating member may be a projection provided on the housing.

Further, guides may be provided on opposite sides of the shutter member, for slidably holding side surface portions of a cover covering the top surface of the optical scanning device.

According to another aspect, the present invention provides an image forming apparatus, including any of the optical scanning devices described above.

The image forming apparatus may include a component mounted on the image forming apparatus when an image is formed, and the rotating member may be rotated by the component or a member linked to the component so that the shutter member is slid and the exposure window is opened, when the component is mounted on the image forming apparatus. Further, the rotating member may be rotated by the component or a member linked to the component so that the shutter member is slid and the exposure window is closed, when the component is removed from the image forming apparatus. The component may be a toner container for disposing or recovering toner.

In the optical scanning device in accordance with the present invention, until the shutter member engages with the regulating member, the link mechanism moved by the rotating member slides the shutter member such that the exposure window opens (or closes) at one end in the longitudinal direction of the shutter member. When the rotating member is further moved, the shutter member engages with the regulating member. Thereafter, it slides the shutter member such that the exposure window opens (or closes) smooth only with a small force at the end opposite to said one end, with the engaging point serving as a fulcrum point. Therefore, even when the shutter member is long in the longitudinal direction, it opens/closes one side at a time and, therefore, the member can be opened/closed smooth without requiring large opening/closing force. Therefore, a large link mechanism or large rotating member is unnecessary. As a result, smooth opening/closing operation of the shutter can be realized with a simple structure, while the dead space between the image forming apparatus and the optical scanning device is made small.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described in detail with reference to the appended figures. In the following description and in the drawings, the same components are denoted by the same reference characters. Their functions and names are also the same. Therefore, detailed description thereof will not be repeated.

Figure 1:
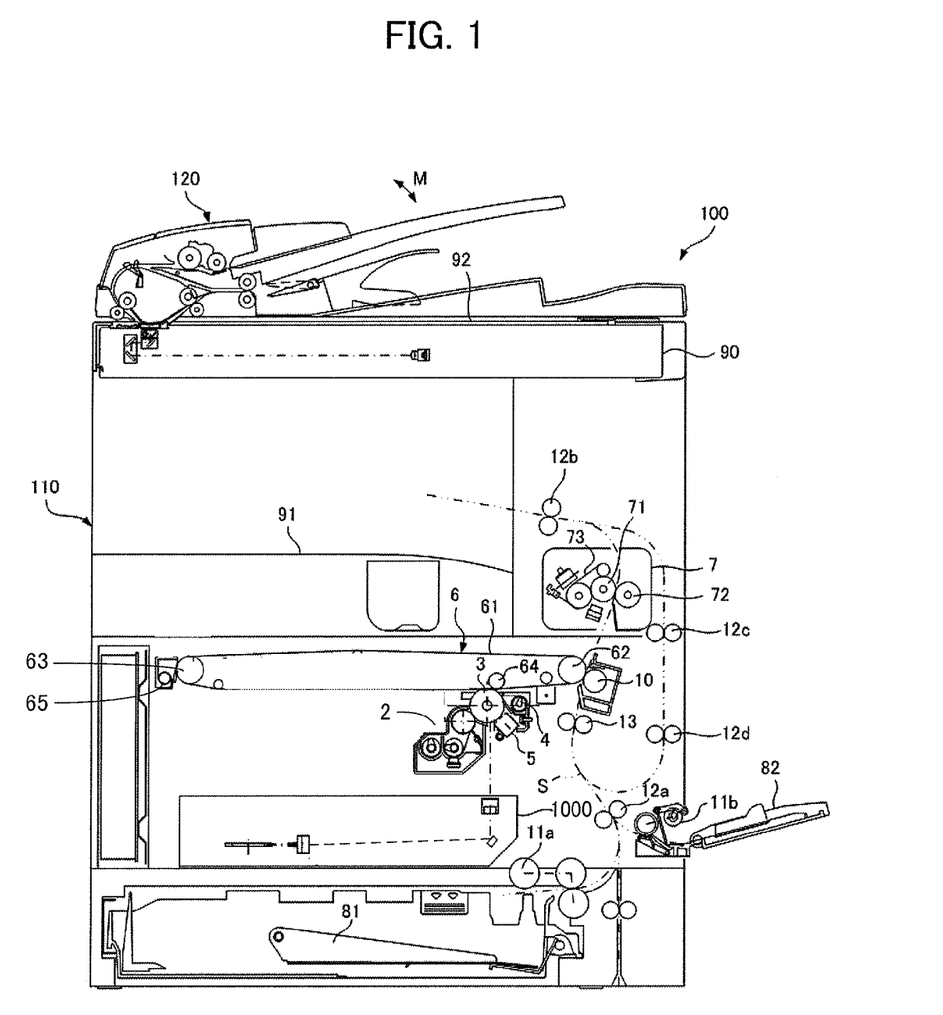
FIG. 1 is a cross-sectional view showing an internal structure of an image forming apparatus including the optical scanning device in accordance with an embodiment of the present invention.

FIG. 1 is a cross-sectional view showing an internal structure of an image forming apparatus 100 provided with an optical scanning device (LSU: Laser Scanning Unit) 1000 in accordance with an embodiment of the present invention.

Image forming apparatus 100 forms an image of a single color on a prescribed sheet (recording paper) in accordance with image data transmitted from outside, and it mainly consists of a main body unit 110 of image forming apparatus 100 and an automatic document feeder 120. Main body unit 110 is formed to include an optical scanning device 1000, a developer 2, a photoreceptor drum 3, a cleaner unit 4, a charger 5, an intermediate transfer belt unit 6, a fixing unit 7, a paper feed cassette 81, and a paper discharge tray 91.

At an upper portion of main body unit 110, a platen 92 formed of a transparent glass for placing a document is provided, and above platen 92, automatic document feeder 120 is attached. Automatic document feeder 120 automatically feeds a document to platen 92. Automatic document feeder 120 is adapted to freely rotate in the direction of an arrow M to be opened, exposing platen 92, so that one can put a document on platen 92.

The image data handled in image forming apparatus 100 is data corresponding to monochrome image of black. Therefore, the number of developer 2, photoreceptor 3, charger 5 and cleaner unit 4 are each one, to form latent image corresponding to one, black color, and by these units, one image station is formed.

Charger 5 functions to uniformly charge a surface of photoreceptor drum 3 to a prescribed potential. Optical scanning device 1000 is formed as a unit including a laser emitting unit and a reflection mirror. In optical scanning device 1000, optical elements such as a polygon mirror for laser beam scanning, and a lens and mirrors for guiding the laser beam reflected by the polygon mirror to photoreceptor drum 3 are arranged. Specific structure of optical scanning device 1000 will be described later. For optical scanning device 1000, use of a write head having light emitting elements arranged in an array, such as EL (Electroluminescence) or LED (Light Emitting Diode) array, is also possible.

Optical scanning device 1000 has a function of forming, by exposing uniformly charged photoreceptor drum 3 in accordance with input image data, an electrostatic latent image in accordance with the image data on a surface of the drum. Developer 2 visualizes the electrostatic latent image formed on photoreceptor drum 3 by black toner. Cleaner unit 4 removes and recovers the toner left on the surface of photoreceptor drum 3 after development and image transfer.

Intermediate transfer belt unit 6 arranged above photoreceptor drum 3 includes an intermediate transfer belt 61, an intermediate transfer belt driving roller 62, an intermediate transfer belt driven roller 63, an intermediate transfer roller 64 and an intermediate transfer belt cleaning unit 65. Intermediated transfer belt driving roller 62, intermediate transfer belt driven roller 63, and intermediate transfer roller 64 are for driving and rotating intermediate transfer belt 61 suspended therearound. Intermediate transfer roller 64 applies transfer bias for transferring the toner image on photoreceptor drum 3 to intermediate transfer belt 61.

Intermediate transfer belt 61 is provided to be in contact with photoreceptor drum 3, and it has a function of forming, by transferring the black toner image formed on photoreceptor drum 3 to intermediate transfer belt 61, a monochrome toner image on intermediate transfer belt 61. Intermediate transfer belt 61 is formed as an endless belt, using a film having the thickness of about 100 μm to about 150 μm.

Transfer of the toner image from photoreceptor drum 3 to intermediate transfer belt 61 is performed by intermediate transfer roller 64 that is in contact with the rear side of intermediate transfer belt 61. To intermediate transfer roller 64, high-voltage transfer bias (high voltage of a polarity (+) opposite to the charging polarity (−) of the toner) is applied, for transferring the toner image. Intermediate transfer roller 64 has, as a base, a metal shaft (for example, of stainless steel) having the diameter of 8 mm to 10 mm, with its surface covered with an electrically conductive elastic material (for example, ethylene-propylene-diene rubber, urethane foam or the like). Because of the conductive elastic material, it is possible to apply high voltage uniformly to intermediate transfer belt 61. Though a roller-shaped transfer electrode is used in the present embodiment, brush or the like may also be usable.

As described above, the electrostatic latent image visualized on photoreceptor drum 3 is transferred to intermediate transfer belt 61. The transferred image information is further transferred to a sheet of paper by means of transfer roller 10, which will be described later, arranged at a position where the sheet of paper is brought into contact with intermediate transfer belt 61, as intermediate transfer belt 61 rotates.

At this time, intermediate transfer belt 61 and transfer roller 10 are brought into pressure contact with each other with a prescribed nip, and a voltage (high voltage of a polarity (+) opposite to the charging polarity (−) of toner) is applied to transfer roller 10 to transfer the toner to the sheet of paper. Further, in order to constantly maintain the nip mentioned above at transfer roller 10, either one of transfer roller 10 and intermediate transfer belt driving roller 62 is formed of a hard material (for example, metal), and the other is formed as an elastic roller of soft material (for example, elastic rubber roller, formable resin roller or the like).

Further, as described above, the toner adhered on intermediate transfer belt 61 as it contacts photoreceptor drum 3 or toner not transferred to the sheet by transfer roller 10 but left on intermediate transfer belt 61 is removed and recovered by intermediate transfer belt cleaning unit 65. Intermediate transfer belt cleaning unit 65 is provided with a cleaning blade, for example, as a cleaning member to be in contact with intermediate transfer belt 61, and intermediate transfer belt 61 is supported by intermediate transfer belt driven roller 63 from its rear side at a portion to be in contact with the cleaning blade.

Paper feed cassette 81 is a tray for storing sheets (recording paper) used for forming images, and it is provided below optical scanning device 1000 at main body unit 110. Sheets used for image forming may also be placed on a manual feed cassette 82. Paper discharge tray 91 provided above main body unit 110 is for stacking printed sheets in a face-down manner.

In main body unit 110, a paper feed path S is formed, substantially extending longitudinally for feeding the sheet in paper feed cassette 81 or manual feed cassette 82 through transfer roller 10 and fixing unit 7 to discharge tray 91. In the vicinity of paper feed path S from paper feed cassette 81 or manual feed cassette 82 to discharge tray 91, pick-up rollers 11*a* and 11*b*, a plurality of conveyer rollers 12*a* to 12*d*, a register roller 13, a transfer roller 10, fixing unit 7 and the like are arranged.

Conveyor rollers 12*a* to 12*d* are small rollers for promoting and assisting feeding of sheets, and a number of such conveyer rollers are provided along the paper feed path S. Pick-up roller 11*a* is provided close to an end of paper feed cassette 81, and it picks up sheets one by one from paper feed cassette 81 and supplies the sheets to paper feed path S. Similarly, pick-up roller 11*b* is provided close to an end of manual feed cassette 82, and it picks up sheets one by one from manual feed cassette 82 and supplies the sheets to paper feed path S.

Register roller 13 is for temporarily holding a sheet that is being fed on paper feed path S. It has a function of feeding the sheet to transfer roller 10 at a timing to have an end of toner image on photoreceptor drum 3 aligned with an end of the sheet.

Fixing unit 7 includes a heat roller 71 and a pressure roller 72. Heat roller 71 and pressure roller 72 are adapted to rotate with a sheet positioned therebetween. Heat roller 71 is set to be a prescribed fixing temperature by a control unit based on a signal from a temperature detector, not shown. As it attains heat-and-pressure contact of toner to the sheet together with pressure roller 72, the black toner image that has been transferred to the sheet is melt and pressed, and the image is thermally fixed on the sheet.

Next, the paper feed path will be described in detail. In image forming apparatus 100, paper feed cassette 81 and manual feed cassette 82 for storing sheets are provided in advance. In order to feed a sheet from paper feed cassette 81 or manual feed cassette 82, pick-up roller 11*a* or 11*b* is arranged, whereby the sheets are guided one by one to paper feed path S.

The sheet fed from paper feed cassette 81 or manual feed cassette 82 is fed to register roller 13 by conveyer roller 12*a* on paper feed path S, fed to transfer roller 10 at a timing to have the tip end of sheet aligned with the tip end of image information on intermediate transfer belt 61, and the image information is written on the sheet. Thereafter, the sheet passes through fixing unit 7, so that not-yet-fixed toner on the sheet is melt and fixed by heat, and then, the sheet is discharged through subsequent conveyer roller 12*b* to discharge tray 91.

The paper feed path described above is followed when one-sided printing on a sheet is required. When double-sided printing is required, conveyer roller 12*b* rotates in reverse direction when printing on one side ends and the trailing end of sheet that has passed through fixing unit 7 is held by the last conveyer roller 12*b*, so that the sheet is guided to conveyer rollers 12*c* and 12*d*. Then, through register roller 13, printing is done on the back side of the sheet, and the sheet is discharged to discharge tray 91.

Figure 2:
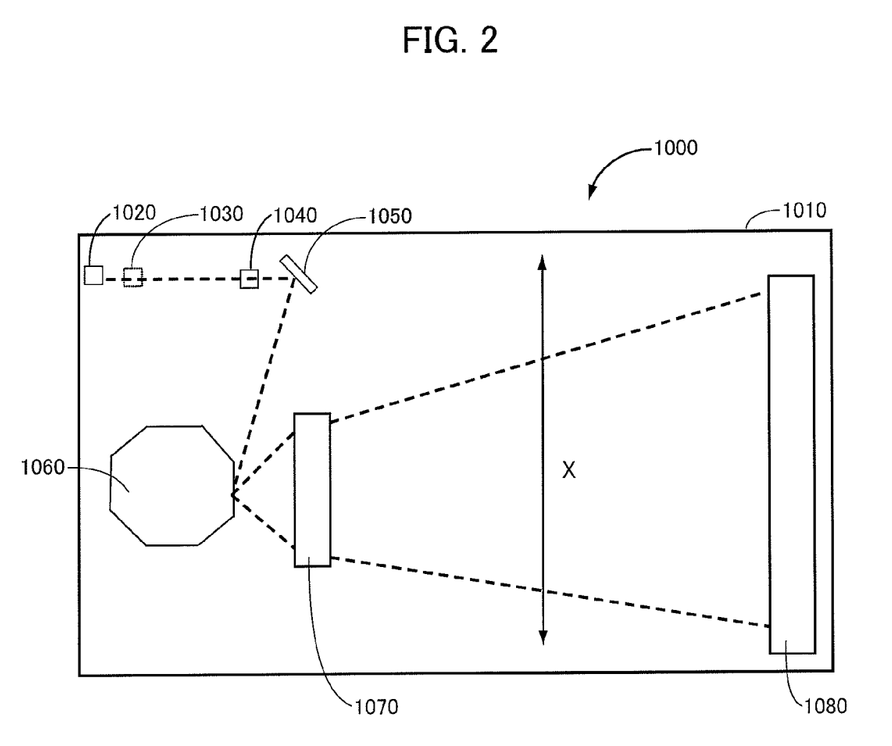
FIG. 2 is a top view showing the internal structure of the optical scanning device.
Figure 3:
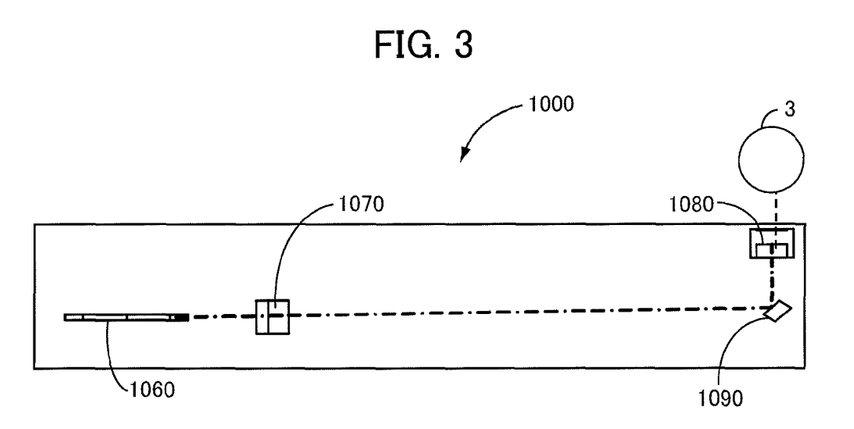
FIG. 3 is a side view showing the internal structure of the optical scanning device.

Next, referring to FIGS. 2 and 3, the internal structure of optical scanning device 1000 will be described in detail. Optical scanning device 1000 in accordance with the present embodiment includes, in housing 1010, the following components: a laser diode 1020 corresponding to black; a reflection mirror 1050 reflecting laser beam from laser diode 1020 that has passed through collimate lens 1030 and cylindrical lens 1040; a polygon mirror (rotating multi-facetted mirror) 1060 reflecting the laser beam from reflection mirror 1050; a first fθ lens 1070 refracting the laser beam from polygon mirror 1060; a returning mirror 1090 reflecting the laser beam that has passed through the first fθ lens 1070; and a second fθ lens 1080 refracting the laser beam from returning mirror 1090.

Polygon mirror 1060 has the shape of a regular polygonal column, and it is driven to rotate at high speed, so that the laser beam is reflected by the mirrors on the circumferential facets, realizing repeated scanning in the main scanning direction X. The first fθ lens 1070, returning mirror 1090 and the second fθ lens 1080 are formed to have a bar shape extending long in the main scanning direction X and short in a direction orthogonal to the main scanning direction X with opposite ends supported, for reflecting and refracting the laser beams for repeated scanning in the main scanning direction X.

The laser beam emitted from laser diode 1020 corresponding to black passes through collimate lens 1030 and cylindrical lens 1040, reflected by reflection mirror 1050, reflected by polygon mirror 1060 for scanning in the main scanning direction X, then passes through the first fθ lens 1070, reflected by returning mirror 1090 and passes through the second fθ lens 1080, and thereafter directed to be incident on photoreceptor drum 3 to form an electrostatic latent image corresponding to black.

As described above, photoreceptor drum 3 is driven to rotate, and as it is irradiated with the laser beam that scans repeatedly in the main scanning direction X, an electrostatic latent image is formed on the surface of photoreceptor drum 3. The electrostatic latent image on the surface of photoreceptor drum 3 is developed to be a toner image, the toner image is transferred by intermediate transfer belt 61 to a sheet of recording paper, and a monochrome toner image is formed on the sheet of recording paper.

Figure 4:
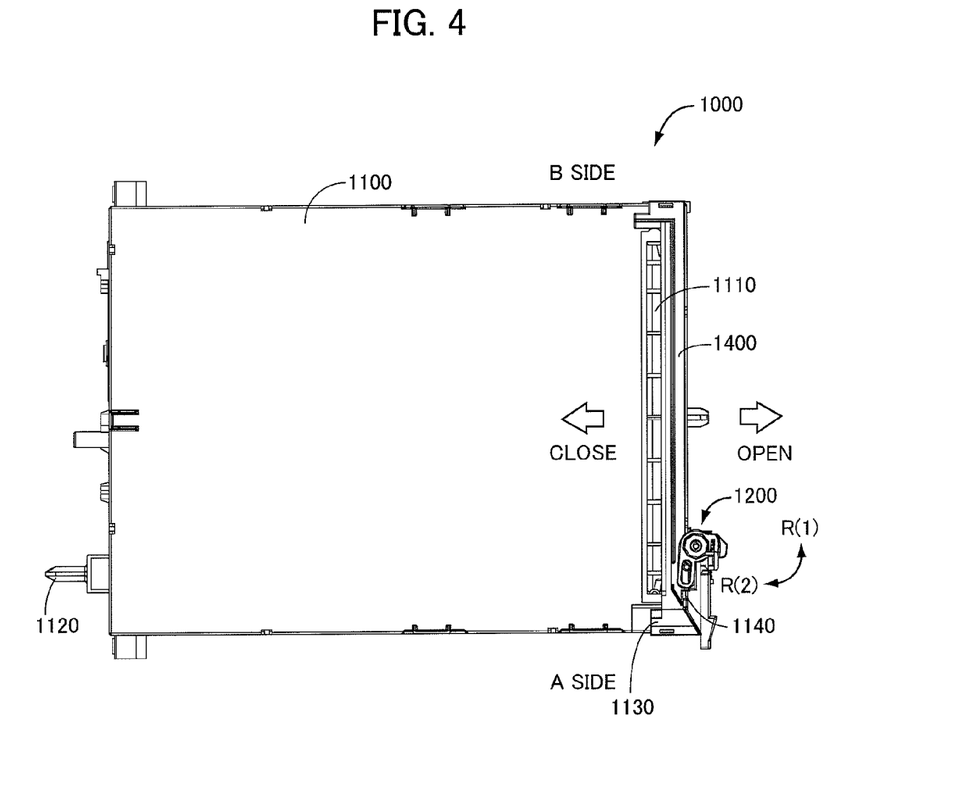
FIG. 4 is a top view of the optical scanning device.
Figure 5:
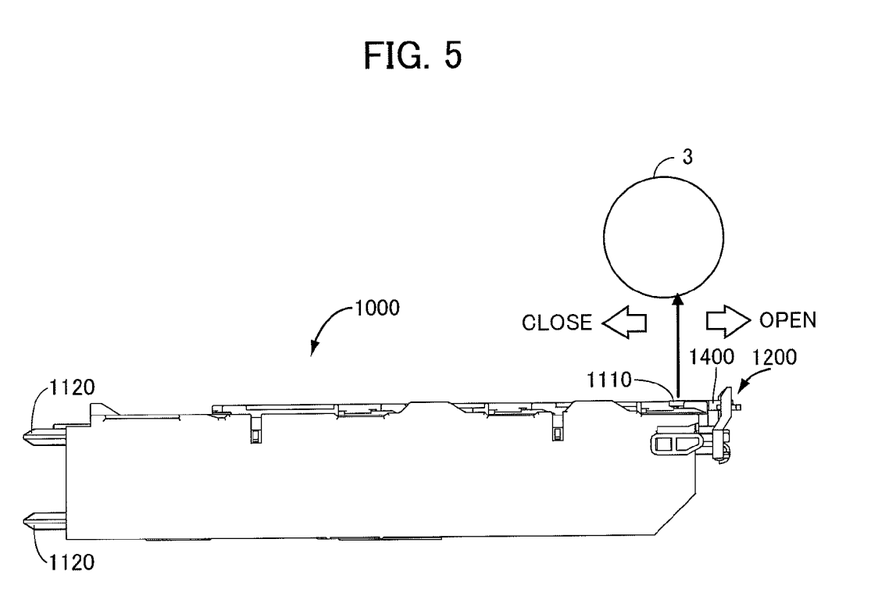
FIG. 5 is a side view of the optical scanning device.

Next, the outer appearance of optical scanning device 1000 in accordance with the present embodiment will be described. FIG. 4 is a top view showing an outer appearance of optical scanning device 1000, and FIG. 5 is a side view showing an outer appearance of optical scanning device 1000. As shown in these views of outer appearance, optical scanning device 1000 has a substantially rectangular parallelepiped shape with small height, and it is formed, for example, of injection molded resin.

Optical scanning device 1000 has an optical scanning device cover 1100 for preventing dust on its upper surface, and at a position of optical scanning device cover 1100 corresponding to the second fθ lens 1080, an exposure window 1110 is provided, through which the laser beam is emitted. Glass is set in exposure window 1110. Exposure window 1110 is provided with a shutter 1400 that is opened/closed by an operation of a rotation cam 1200. The opening and closing directions of shutter 1400 are indicated by arrows in FIG. 4. A plurality of guide pins 1120 are provided as positioning jigs to be used when optical scanning device 1000 is mounted on image forming apparatus 100. For optical scanning device cover 1100 and shutter 1400, a general, inexpensive material having relatively large coefficient of thermal expansion such as ABS (acrylonitrile butadiene styrene copolymer resin) may be used, as these do not have direct influence on the emission accuracy or diameter of laser beam.

Referring to FIG. 5, when optical scanning device 1000 is mounted on image forming apparatus 100, the laser beam reflected by polygon mirror 1060 for scanning and collected by returning mirror 1090 and the second fθ lens 1080 is emitted through exposure window 1110 to photoreceptor drum 3. In image forming apparatus 100 as described above, developer 2, cleaner unit 4, charger 5, and transfer roller 64 for transferring the toner image on photoreceptor drum 3 to intermediate transfer belt 61 as the next transfer member are arranged close to photoreceptor drum 3. During maintenance or exchange work of developer 2 or photoreceptor drum 3, it is possible that the toner or dust fall onto exposure window 1110 positioned below these components. Therefore, it is preferred that exposure window 1110 be closed in a manner linked with such a work. It is noted that the laser beam incident on photoreceptor drum 3 is focused as highly as to 100 microns or less. Therefore, a mechanism is necessary to prevent leakage of beam directed to photoreceptor drum or even the beam reflected by other members, when polygon mirror 1060 is stopped and scanning does not take place. Therefore, the method of intercepting laser beam by shutter 1400 is very effective.

Figure 6:
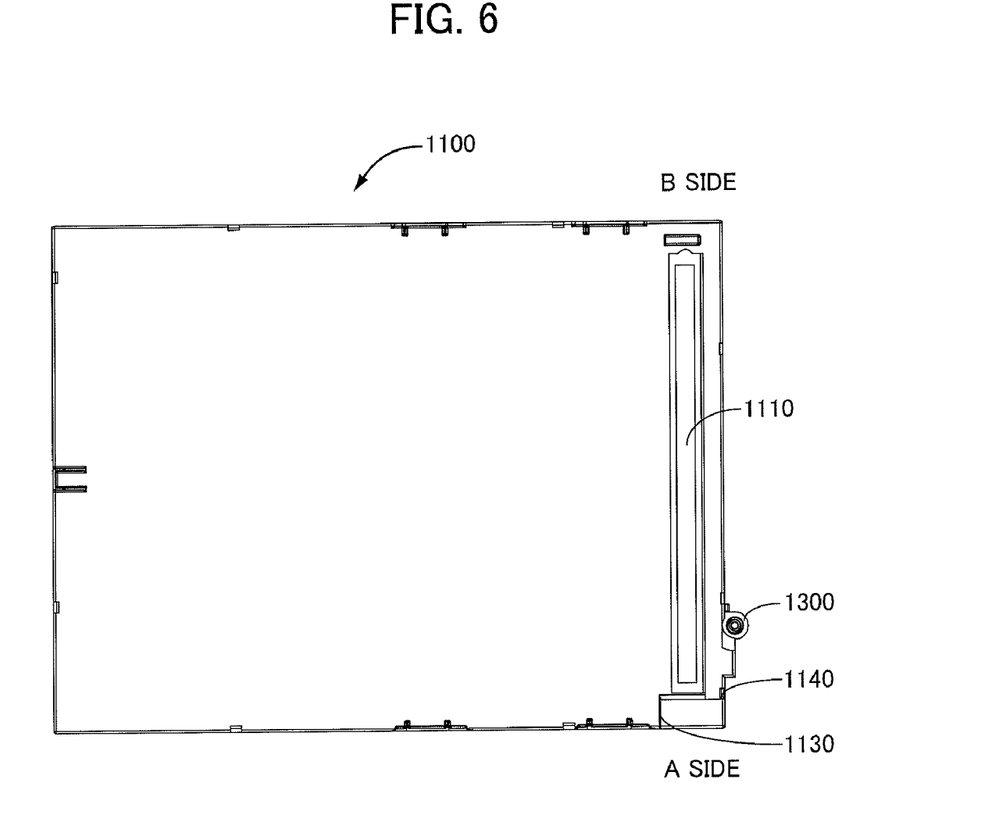
FIG. 6 is a top view showing a cover of the optical scanning device.

As shown in FIG. 6, on an upper surface of optical scanning device cover 1100, provided are: exposure window 1110 extending from A-side to B-side; a rotation cam plate 1300 on which rotation cam 1200 is attached, provided at the A-side end on the side of exposure window 1110; and two stoppers (a close stopper 1130 and an open stopper 1140 as regulating members), provided close to rotation cam plate 1300. Substantially at the center of rotation cam plate 1300, a hole is provided, for axially supporting the rotation center of rotation cam 1200.

The two stoppers provided on optical scanning device cover 1100 are as follows. The first stopper is close stopper 1130 that comes into contact with an A-side closing contact portion (specifically, a closing side contact portion 1430, which will be described later) of shutter 1400 when shutter 1400 is closed by the operation of rotation cam 1200, forming a fulcrum for closing the B-side of shutter 1400. The second stopper is open stopper 1140 that comes into contact with an A-side opening contact portion (specifically, an opening side contact portion 1440, which will be described later) of shutter 1400 when shutter 1400 is opened by the operation of rotation cam 1200, forming a fulcrum for opening the B-side of shutter 1400. Close stopper 1130 and open stopper 1140 also function as regulating members when shutter 1400 is opened/closed.

Figure 7:
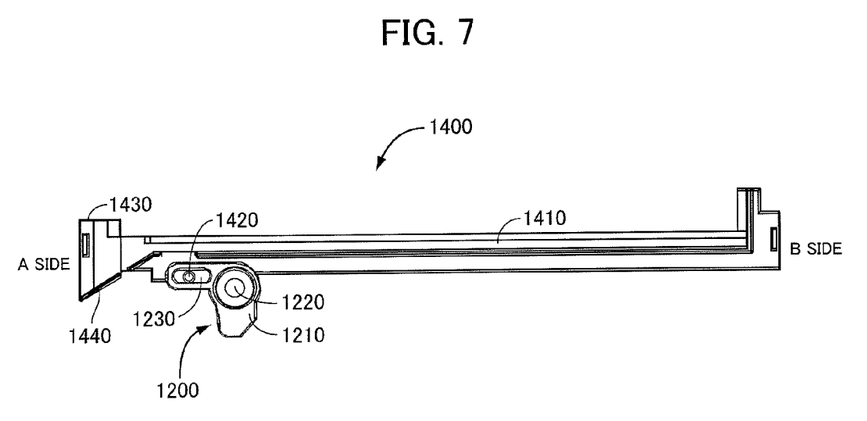
FIG. 7 is a top view showing a shutter of the optical scanning device.
Figure 8:
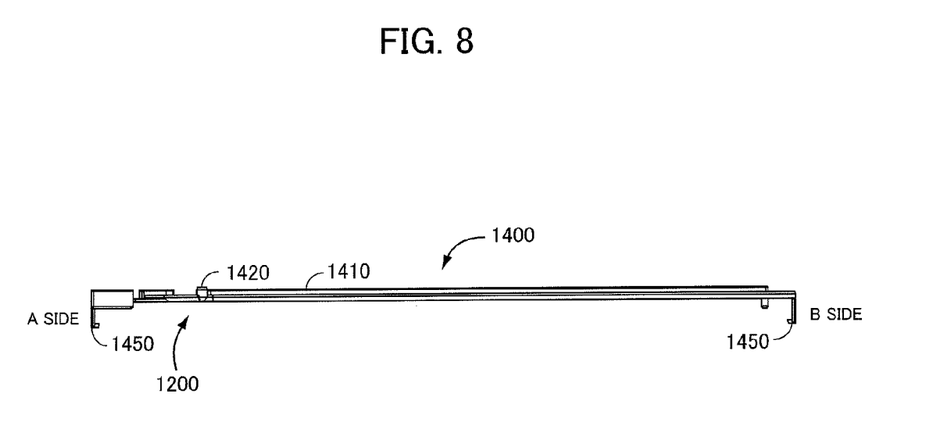
FIG. 8 is a side view showing the shutter of the optical scanning device.

FIG. 7 is a top view of rotation cam 1200 and shutter 1400, and FIG. 8 is a side view of rotation cam 1200 and shutter 1400. In these figures, rotation cam 1200 is shown attached to rotation cam plate 1300 on optical scanning device cover 1100.

Shutter 1400 is a flat member, formed of a non-transparent resin (preferably, black resin) extending to cover the entire width of exposure window 1110. Shutter 1400 has a columnar projection 1420 slidably engaging with a link portion 1230 having an elongate hole shape of rotation cam 1200. The width of link portion 1230 (size in the up-down direction of FIG. 7) is slightly larger than the diameter of projection 1420, and the diameter of circular hole (semi-circular portion) at opposite ends of link portion 1230 is slightly larger than the diameter of projection 1420. Therefore, projection 1420 can freely move, sliding in link portion 1230, and can rotate at the semi-circular position at either end of link portion 1230. As projection 1420 moves or rotates, inclination of shutter 1400 changes, enabling opening/closing of shutter 1400.

At the A-side end of shutter 1400, on the upper side of optical scanning device cover 1100, a closing side contact portion 1430 and an opening side contact portion 1440 are provided, to be respectively in contact with close stopper 1130 and open stopper 1140. As shown in FIG. 7, closing side contact portion 1430 has a shape that extends along the longitudinal direction of shutter 1400, while opening side contact portion 1440 has a shape that extends diagonally to the longitudinal direction of shutter 1400.

Rotation cam 1200 is an approximately L-shaped flat member, including a rotation shaft 1220 axially supported in the hole of rotation cam plate 1300, an engaging portion 1210 for rotating rotation cam 1200, and link portion 1230 having the elongate hole shape. As described above, columnar projection 1420 fixedly provided on the upper surface of shutter 1400 is slidably and rotatably held in link portion 1230. Engaging portion 1210 comes into contact, for example, with a toner tank, so that rotation cam 1200 rotates, opening shutter 1400 that has been in the closed state.

As shown in FIG. 8, on a side surface of shutter 1400, a side guide portion 1450 is provided. Side guide portion 1450 is slidably engaged with a side surface of optical scanning device cover 1100. Since side guide portion 1450 is provided, shutter 1400 does not come off from optical scanning device cover 1100, and shutter 1400 is slidably and integrally mounted on optical scanning device 1000.

The operation of opening/closing shutter 1400 of optical scanning device 1000 provided in image forming apparatus 100 having such structures will be described in the following.

<Shutter Opening Operation>

Figure 9:
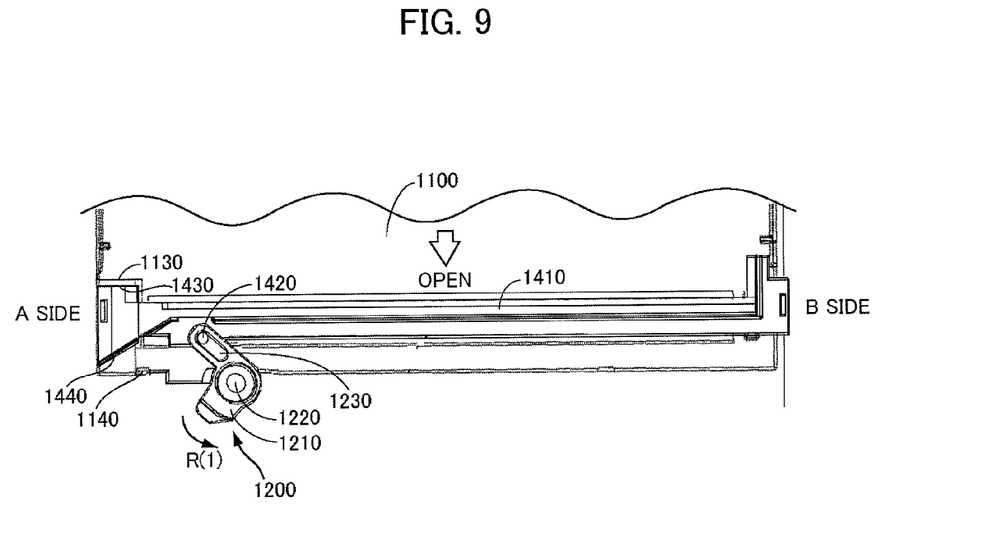
FIG. 9 is a top view showing a state in which the shutter is fully closed, on the optical scanning device.
Figure 10:
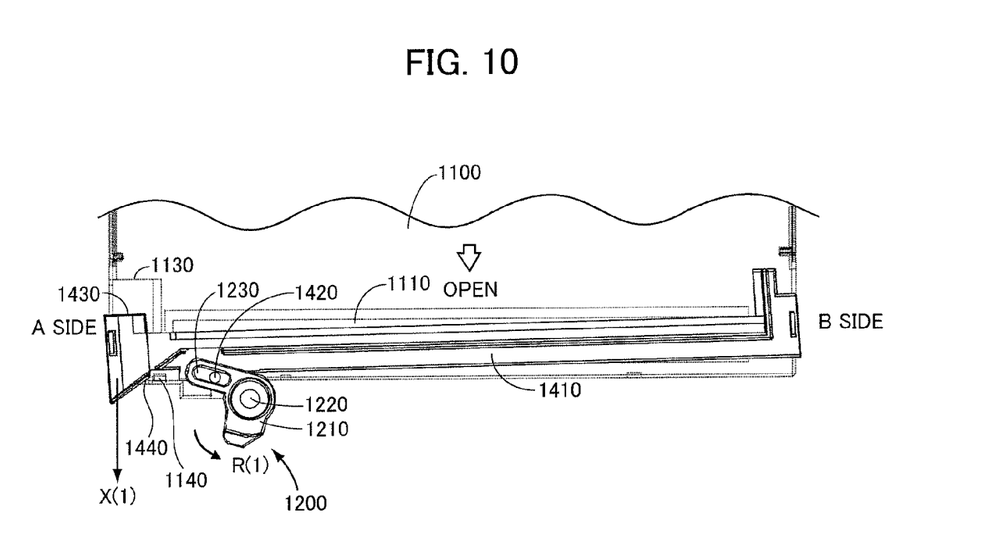
FIG. 10 is a top view showing a state in which the shutter is being opened from the state of FIG. 9.
Figure 11:
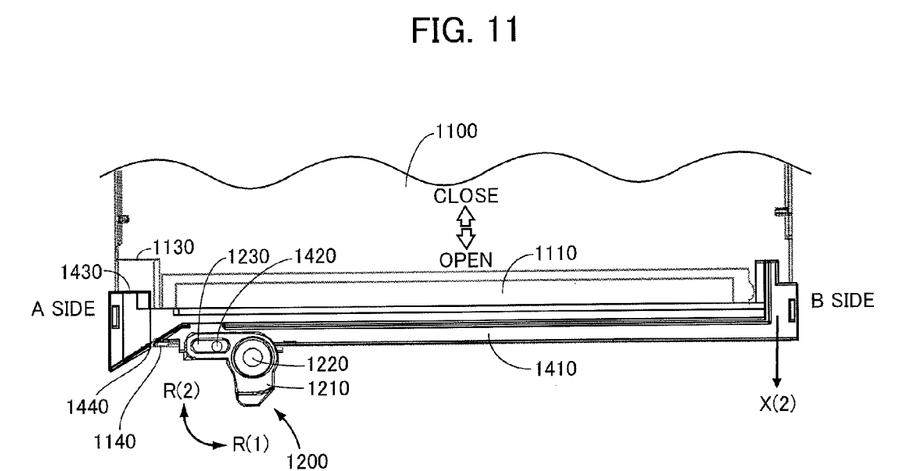
FIG. 11 is a top view showing a state in which the shutter is fully opened, on the optical scanning device.

FIG. 9 is a partial top view of optical scanning device 1000 showing shutter 1400 fully closed, FIG. 10 is a partial top view showing shutter 1400 being opened from the state of FIG. 9, and FIG. 11 is a partial top view showing shutter 1400 fully opened.

As shown in FIG. 9, when shutter 1400 is fully closed, shutter 1400 fully covers exposure window 1110, perfectly shutting off the laser beam emitted through exposure window 1110. In this state, closing side contact portion 1430 of shutter 1400 is in contact with close stopper 1130. Since closing side contact portion 1430 and close stopper 1130 have shapes that extend along the longitudinal direction of shutter 1400 and have large contact surfaces, such a state of contact is not easily lost unless rotation cam 1200 rotates. Further, with the point of contact between closing side contact portion 1430 and close stopper 1130 functioning as a fulcrum, projection 1420 of shutter 1400 is pushed upward in FIG. 9 at elongate link portion 1230 (point of effort), while the B-side as the point of load is also held with upward force. Thus, shutter 1400 as a whole is kept stably in the closed state.

When rotation cam 1200 is rotated in the direction of an arrow R(1) of FIG. 9 from this state, rotation cam 1200 starts to rotate about rotation shaft 1220. As shown in FIG. 10, projection 1420 of shutter 1400 held in link portion 1230 of rotation cam 1200 is pushed down receiving a downward force in FIG. 10, and hence, A-side of shutter 1400 is pushed down. The A-side of shutter 1400 is pushed down, and the A-side of shutter 1400 turns in the direction of an arrow X(1), so that opening side contact portion 1440 comes into contact with open stopper 1140. Up to this point, projection 1420 of shutter 1400 only slides in link portion 1230, substantially not rotating. The reason why the A-side of shutter 1400 starts to rotate earlier than the B-side is that the force (moment) to rotate against friction between optical scanning device cover 1100 and shutter 1400 is smaller on the A-side than the B-side.

When rotation cam 1200 is further rotated in the direction of R(1) from the state shown in FIG. 10, projection 1420 of shutter 1400 held in link portion 1230 rotates, with the point of contact between opening side contact portion 1440 and open stopper 1140 functioning as a fulcrum. Since projection 1420 is fixed on shutter 1400, shutter 1400 rotates as projection 1420 rotates. At this time, shutter 1400 is further pushed down as shown in FIG. 11, the B-side of shutter 1400 is pushed down in the direction of an arrow X(2) of FIG. 11, and as a result, exposure window 1110 comes to be fully opened. In the state shown in FIG. 11, with the point of contact between opening side contact portion 1440 and open stopper 1140 functioning as a fulcrum, projection 1420 of shutter 1400 is pushed downward in FIG. 11 at elongate link portion 1230 (point of effort), while the B-side as the point of load is also held with downward force. Thus, shutter 1400 as a whole is kept stably in the open state.

<Shutter Closing Operation>

As shown in FIG. 11, with shutter 1400 fully opened, exposure window 1110 is fully exposed, not hindering emission of laser beam through exposure window 1110.

Figure 12:
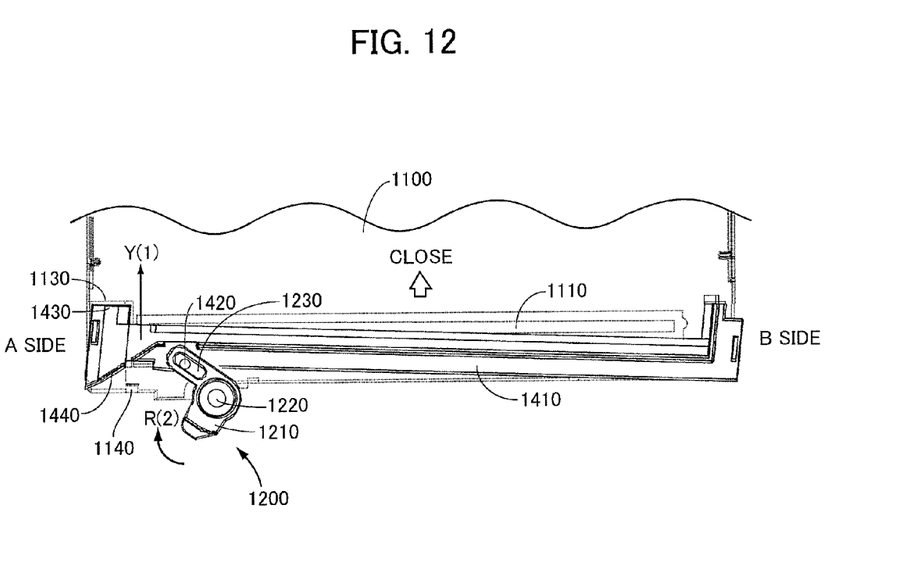
FIG. 12 is a top view showing a state in which the shutter is being closed from the state of FIG. 11.

When rotation cam 1200 is rotated in the direction of an arrow R(2) of FIG. 11 from this state, rotation cam 1200 starts to rotate about rotation shaft 1220. As shown in FIG. 12, projection 1420 of shutter 1400 held in link portion 1230 of rotation cam 1200 is pushed up receiving an upward force in FIG. 12, and hence, A-side of shutter 1400 is pushed up. The A-side of shutter 1400 is pushed up, and the A-side of shutter 1400 turns in the direction of an arrow Y(1), so that closing side contact portion 1430 comes into contact with close stopper 1130. Up to this point, projection 1420 of shutter 1400 only slides in link portion 1230, substantially not rotating. The reason why the A-side of shutter 1400 starts to rotate earlier than the B-side is, as described above, that the force (moment) to rotate against friction between optical scanning device cover 1100 and shutter 1400 is smaller on the A-side than the B-side.

Figure 13:
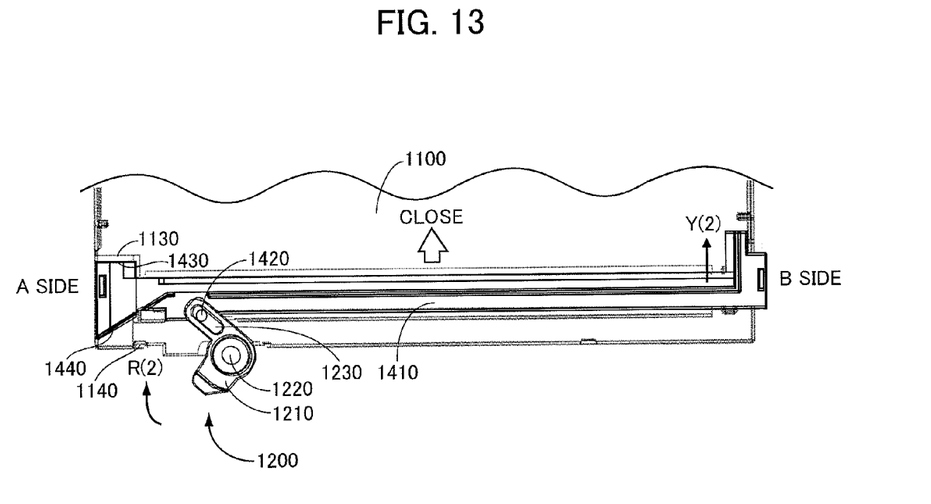
FIG. 13 is a top view showing a state in which the shutter is fully closed from the state of FIG. 12.

When rotation cam 1200 is further rotated in the direction of R(2) from the state shown in FIG. 12, projection 1420 of shutter 1400 held in link portion 1230 rotates, with the point of contact between closing side contact portion 1430 and close stopper 1130 functioning as a fulcrum. Since projection 1420 is fixed on shutter 1400, shutter 1400 rotates as projection 1420 rotates. At this time, shutter 1400 is further pushed up as shown in FIG. 13, the B-side of shutter 1400 is pushed up in the direction of an arrow Y(2) of FIG. 13, and as a result, exposure window 1110 comes to be fully closed. In the state shown in FIG. 13, shutter 1400 as a whole is kept stably in the open state, as described above.

As can be seen from the foregoing, by the optical scanning device and the image forming apparatus including the device in accordance with the present embodiment, by rotating a rotation cam positioned apart from the center in the longitudinal direction of the exposure window through which the laser beam is emitted, the shutter covering the exposure window can easily be opened/closed. Further, by the functions of the link and stoppers, the shutter can be held stably in the open state and in the closed state. Since stable holding is possible, it becomes unnecessary to regulate the operation of rotation cam using an elastic member such as a spring. Particularly, as the rotation cam is small relative to the optical scanning device and the shutter is thin, the exposure window can be reliably and easily opened/closed without increasing the size of optical scanning device.

It is preferred that rotation cum 1200 is rotated by using a removing and recovering toner bottle, for example, which is always set at a prescribed position at the time of image forming operation. Rotation cam 1200 is adapted to rotate in the direction of arrow R(1) by the toner bottle or a member linked to the toner bottle, when the toner bottle is set in a prescribed position. Rotation cam 1200 is adapted to rotate in the direction of arrow R(2) by the toner bottle or the member linked to the toner bottle, when the toner bottle is taken away from the prescribed position. By such an arrangement, it becomes possible to open the shutter covering the exposure window of optical scanning device at the time of image formation (that is, when the laser beam is emitted), to realize satisfactory image formation, and to close the shutter to prevent inadvertent emission of laser beam not at the time of image formation.

It is also preferred that that rotation cum 1200 is rotated by using the photoreceptor drum, various rollers and the like that are always taken away from the prescribed positions at the time of maintenance. Rotation cam 1200 is adapted to be rotated in the direction of arrow R(2) by the photoreceptor drum or a member linked to the photoreceptor drum, when the photoreceptor drum is taken out from the prescribed position. Rotation cam 1200 is adapted to be rotated in the direction of arrow R(1) by the photoreceptor drum or a member linked to the photoreceptor drum, when the photoreceptor drum is set in the prescribed position. By such an arrangement, it becomes possible to close the shutter covering the exposure window of optical scanning device at the time of maintenance, thereby to prevent falling toner or dust in the image forming apparatus from contaminating the exposure window.

Further, a torsion coil spring for applying elastic force in the direction of arrow R(2) to rotation cam 1200 may be provided. By providing such a spring, it follows that the exposure window is always covered by the shutter unless a force against the elastic force of the spring is applied. Thus, contamination of the exposure window can be prevented more reliably.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An optical scanning device, scanning an image carrier with a light beam emitted from an exposure window formed on a housing, for forming an electrostatic latent image on said image carrier, comprising:
    a shutter member provided on an upper surface of said housing, for opening/closing said exposure window;
    a link mechanism for sliding said shutter member;
    a rotating member for operating said link mechanism; and
    a regulating member provided on said housing, to be engaged with said shutter member; wherein
    said link mechanism allows sliding of said shutter member so that the exposure window is opened/closed at one end in the longitudinal direction of said shutter member, until said shutter member slid by the operation of said rotating member engages with said regulating member, and
    allows sliding of said shutter member so that the exposure window is opened/closed at the other end opposite to said one end, after said shutter member engages with said regulating member.

2. The optical scanning device according to claim 1, wherein
    said link mechanism is provided at an end away from the center in the longitudinal direction of said shutter member, and
    allows sliding of said shutter member so that said exposure window is opened/closed at a link mechanism side until said shutter member engages with said regulating member, and allows sliding of said shutter member so that said exposure window is opened/closed at a side opposite to the link mechanism side after said shutter member engages with said regulating member.

3. The optical scanning device according to claim 2, wherein
    said regulating member is provided on said link mechanism side.

4. The optical scanning device according to claim 1, wherein
    said regulating member includes an open stopper that functions when said exposure window is opened and a close stopper that functions when said exposure window is closed.

5. The optical scanning device according to claim 4, wherein
    said regulating member is provided on said link mechanism side.

6. The optical scanning device according to claim 1, wherein
    said regulating member is a projection provided on said housing.

7. The optical scanning device according to claim 1, comprising
    guides provided on opposite sides of said shutter member, for slidably holding side surface portions of a cover covering the top surface of said optical scanning device.

8. An image forming apparatus, comprising the optical scanning device according to claim 1.

9. The image forming apparatus according to claim 8, comprising
    a component mounted on the image forming apparatus when an image is formed, wherein
    said rotating member is rotated by said component or a member linked to said component so that said shutter member is slid and the exposure window is opened, when said component is mounted on said image forming apparatus.

10. The image forming apparatus according to claim 9, wherein
    said component is a toner container.

11. The image forming apparatus according to claim 8, comprising
    a component mounted on the image forming apparatus when an image is formed, wherein
    said rotating member is rotated by said component or a member linked to said component so that said shutter member is slid and the exposure window is closed, when said component is removed from said image forming apparatus.

12. The image forming apparatus according to claim 11, wherein
    said component is a toner container.

* * * * *